(12) United States Patent
Lu et al.

(10) Patent No.: US 12,713,267 B2
(45) Date of Patent: Aug. 18, 2026

(54) USER EQUIPMENT (UE) INITIATED INTELLIGENT ADAPTIVE MEASUREMENT GAPS

(71) Applicant: T-Mobile USA, Inc., Bellevue, WA (US)

(72) Inventors: Kun Lu, Bellevue, WA (US); Jun Liu, Sammamish, WA (US); Egil Gronstad, Encinitas, CA (US)

(73) Assignee: T-Mobile USA, Inc., Bellevue, WA (US)

( * ) Notice: Subject to any disclaimer, the term of this patent is extended or adjusted under 35 U.S.C. 154(b) by 302 days.

(21) Appl. No.: 18/402,686

(22) Filed: Jan. 2, 2024

(65) Prior Publication Data

US 2025/0220475 A1 Jul. 3, 2025

(51) Int. Cl.
*H04W 24/10* (2009.01)
*H04W 56/00* (2009.01)
*H04W 76/20* (2018.01)

(52) U.S. Cl.
CPC ....... *H04W 24/10* (2013.01); *H04W 56/0045* (2013.01); *H04W 76/20* (2018.02)

(58) Field of Classification Search
CPC .. H04W 56/0045; H04W 76/20; H04W 24/10
See application file for complete search history.

(56) References Cited

U.S. PATENT DOCUMENTS 12,593,236 B2 * 3/2026 Lu ......................... H04W 24/10
2013/0331098 A1 12/2013 Balasubramaniyan et al.
2014/0022974 A1 1/2014 Eriksson et al.
2018/0227785 A1 * 8/2018 Yiu .................. H04W 36/0088
(Continued)

FOREIGN PATENT DOCUMENTS

GB 2493707 A * 2/2013 .......... H04W 64/006
WO 2021159291 A1 8/2021
(Continued)

OTHER PUBLICATIONS

"International Search Report and Written Opinion", received in International Application No. PCT /US2024/059065 mailed on Apr. 7, 2025, 13 pages.
(Continued)

*Primary Examiner* — Kenny S Lin
(74) *Attorney, Agent, or Firm* — Foley IP Law, PLLC

(57) ABSTRACT

Solutions are disclosed that provide for user equipment (UE) initiated intelligent adaptive measurement gaps. A stationary (non-moving) UE has a reduced likelihood of requiring a handover (HO) to a neighboring cell and thus, unless the serving cell has degraded or interference has increased, a reduced urgency of measuring signal reception from neighboring cells. A UE receives a radio resource control (RRC) message specifying a measurement gap repetition period (MGRP) from a wireless network, and upon determining that it has been stationary (within some range) for a threshold length of time, skips a measurement gap specified by the MGRP. In some examples, the UE uses changes (or lack thereof) in the uplink timing advance to ascertain whether it has moved or been stationary. In some examples, the MGRP is indicated as having one of four values: 20 milliseconds (ms), 40 ms, 80 ms, and 160 ms.

20 Claims, 8 Drawing Sheets

(56) References Cited

U.S. PATENT DOCUMENTS

2018/0324552 A1* 11/2018 Kumar .................. H04W 4/027
2018/0324619 A1* 11/2018 Harada ................. H04W 24/10
2019/0082392 A1* 3/2019 Balasubramanian ........................ G06F 1/3278
2021/0400589 A1 12/2021 Yiu et al.
2022/0078650 A1* 3/2022 Lee ....................... H04W 24/08
2022/0369265 A1 11/2022 He et al.
2023/0292273 A1* 9/2023 Zhang ............... H04W 56/0045
2024/0275541 A1* 8/2024 Mostafa ................ H04L 5/0044
2025/0142384 A1* 5/2025 Lu ......................... H04W 76/20
2025/0168677 A1* 5/2025 Maamari ............... H04W 24/08
2025/0247728 A1* 7/2025 Cui .................... H04B 7/18513
2025/0247914 A1* 7/2025 Chandrashekar ..... H04W 24/10

FOREIGN PATENT DOCUMENTS

WO WO-2022022591 A1 * 2/2022 ............ H04W 72/23
WO WO-2023165708 A1 * 9/2023 ............. H04B 7/088

OTHER PUBLICATIONS

Patrick Merias et al., “Moderator Summary#1—Study on XR Specific Capacity Improvements”, 3GPP Draft; R1-2212606; vol. RAN WG1, No. Toulouse, Nov. 15, 2022, 66 pages.
Intel Corporation, “UE power consumption reduction in RRM measurements”, 3GPP Draft; R1-1810797, vol. RAN WG1, No. Chengdu, China; Sep. 29, 2018, 3 pages.
International Search Report and Written Opinion issued in PCT Application No. PCT/US2024/053133 Mailed Date: Jan. 29, 2025, 14 pages.

* cited by examiner 100
110
102
106
111
112
MEASUREMENT SKIP LOGIC 400
ACCESS NODE 113
SESSION MGMT. NODE 114
PACKET ROUTING NODE 116
PROXY NODE 117
ACCESS MEDIA GATEWAY (IMS-AGW) 120
122
PACKET DATA NETWORK 124
126

Figure 3:
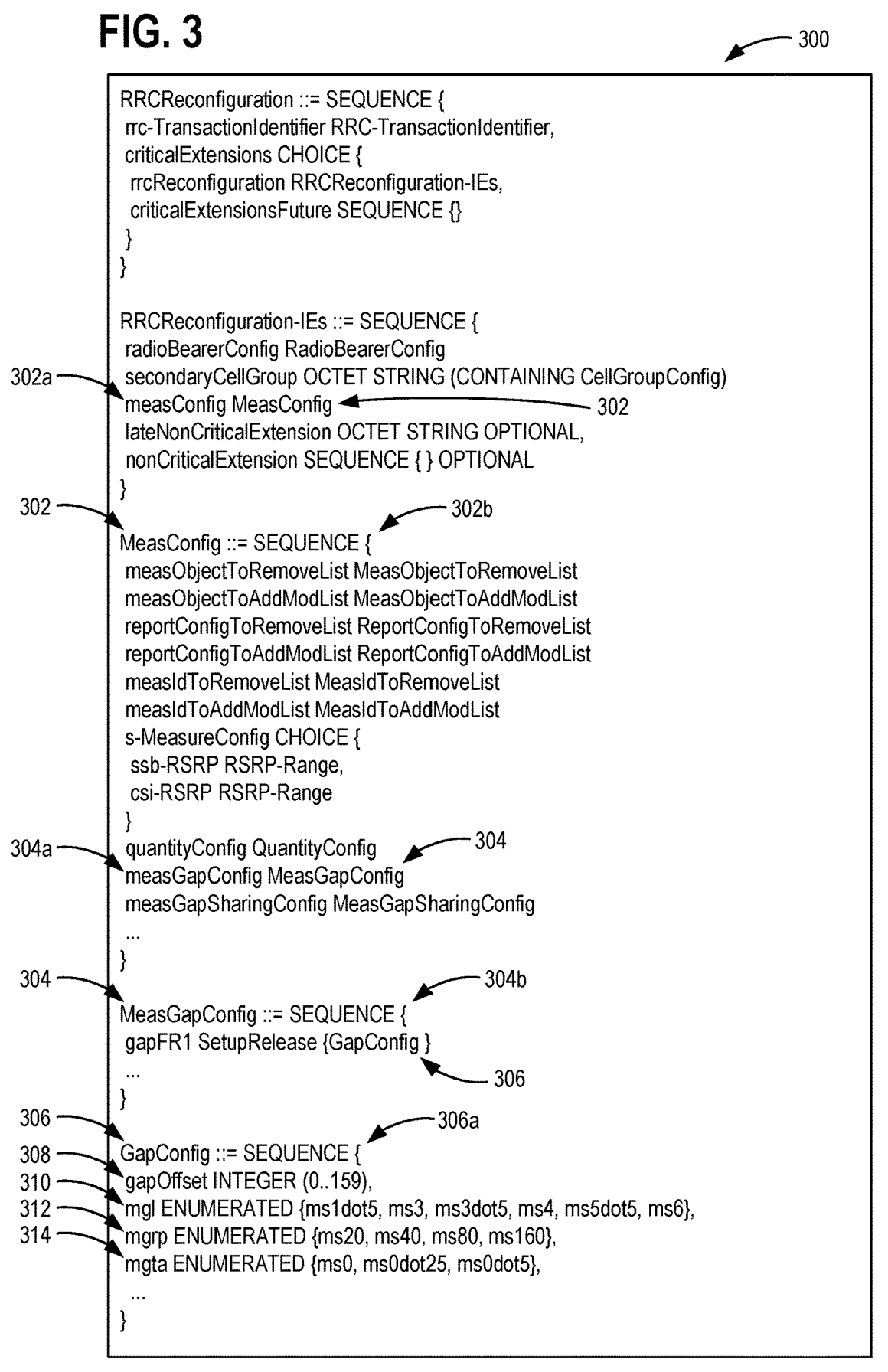

```
RRCReconfiguration ::= SEQUENCE {
 rrc-TransactionIdentifier RRC-TransactionIdentifier,
 criticalExtensions CHOICE {
  rrcReconfiguration RRCReconfiguration-IEs,
  criticalExtensionsFuture SEQUENCE {}
 }
}

RRCReconfiguration-IEs ::= SEQUENCE {
 radioBearerConfig RadioBearerConfig
 secondaryCellGroup OCTET STRING (CONTAINING CellGroupConfig)
 measConfig MeasConfig
 lateNonCriticalExtension OCTET STRING OPTIONAL,
 nonCriticalExtension SEQUENCE { } OPTIONAL
}

MeasConfig ::= SEQUENCE {
 measObjectToRemoveList MeasObjectToRemoveList
 measObjectToAddModList MeasObjectToAddModList
 reportConfigToRemoveList ReportConfigToRemoveList
 reportConfigToAddModList ReportConfigToAddModList
 measIdToRemoveList MeasIdToRemoveList
 measIdToAddModList MeasIdToAddModList
 s-MeasureConfig CHOICE {
  ssb-RSRP RSRP-Range,
  csi-RSRP RSRP-Range
 }
 quantityConfig QuantityConfig
 measGapConfig MeasGapConfig
 measGapSharingConfig MeasGapSharingConfig
 ...
}

MeasGapConfig ::= SEQUENCE {
 gapFR1 SetupRelease {GapConfig }
 ...
}

GapConfig ::= SEQUENCE {
 gapOffset INTEGER (0..159),
 mgl ENUMERATED {ms1dot5, ms3, ms3dot5, ms4, ms5dot5, ms6},
 mgrp ENUMERATED {ms20, ms40, ms80, ms160},
 mgta ENUMERATED {ms0, ms0dot25, ms0dot5},
  ...
}
```

FIG. 4

500
UE
102
BASESTATION
111
BASESTATION
112
RRC message 300a
RRC Complete message 502
Measurement 504
312
Measurement 506
508
Skip alert, notification or stationary, or request 510
Instruction or acknowledgment 512
312
Measurement 514 SKIPPED
312
Measurement 516 SKIPPED
312
Measurement 518

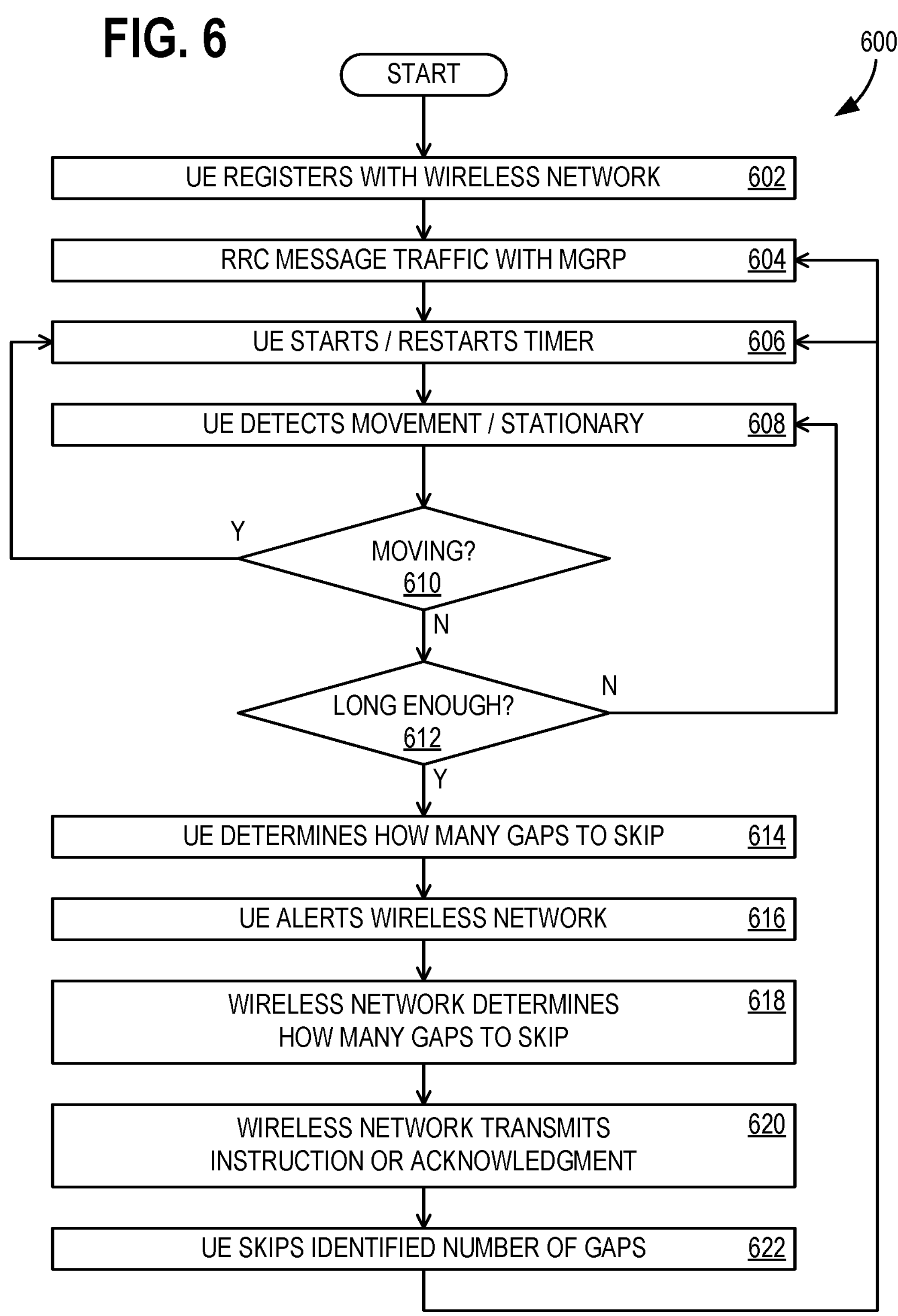
FIG. 6
600
START
UE REGISTERS WITH WIRELESS NETWORK 602
RRC MESSAGE TRAFFIC WITH MGRP 604
UE STARTS / RESTARTS TIMER 606
UE DETECTS MOVEMENT / STATIONARY 608
MOVING? 610
Y
N
LONG ENOUGH? 612
N
Y
UE DETERMINES HOW MANY GAPS TO SKIP 614
UE ALERTS WIRELESS NETWORK 616
WIRELESS NETWORK DETERMINES HOW MANY GAPS TO SKIP 618
WIRELESS NETWORK TRANSMITS INSTRUCTION OR ACKNOWLEDGMENT 620
UE SKIPS IDENTIFIED NUMBER OF GAPS 622

Figure 7:
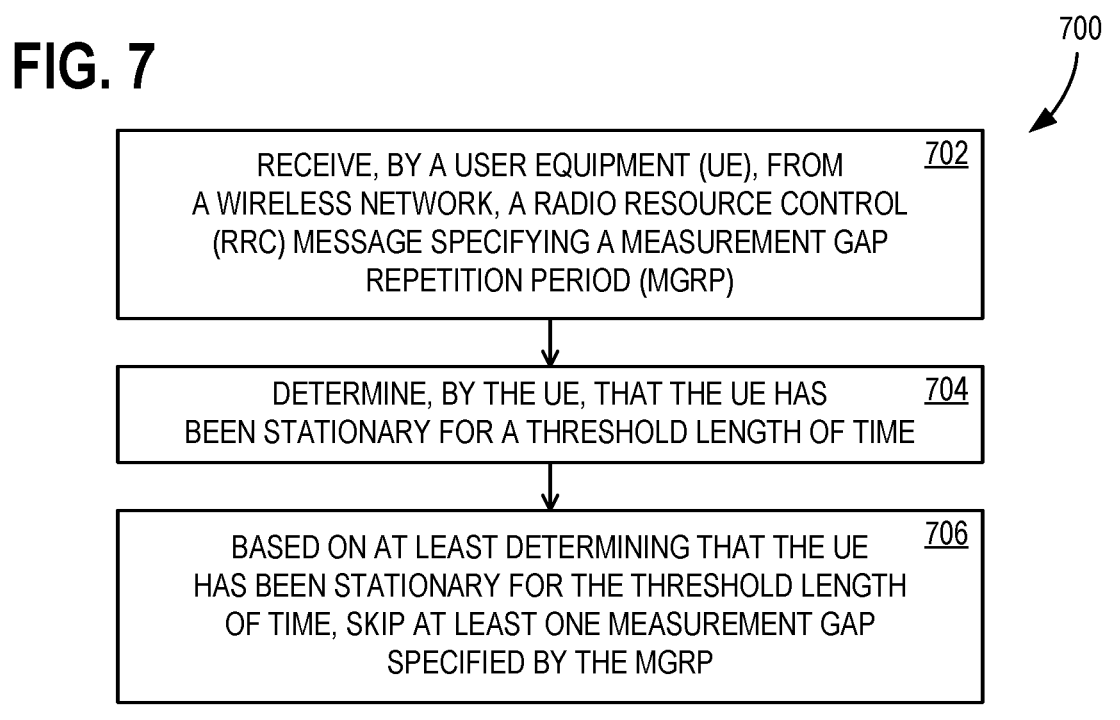

RECEIVE, BY A USER EQUIPMENT (UE), FROM A WIRELESS NETWORK, A RADIO RESOURCE CONTROL (RRC) MESSAGE SPECIFYING A MEASUREMENT GAP REPETITION PERIOD (MGRP) 702

DETERMINE, BY THE UE, THAT THE UE HAS BEEN STATIONARY FOR A THRESHOLD LENGTH OF TIME 704

BASED ON AT LEAST DETERMINING THAT THE UE HAS BEEN STATIONARY FOR THE THRESHOLD LENGTH OF TIME, SKIP AT LEAST ONE MEASUREMENT GAP SPECIFIED BY THE MGRP 706

USER EQUIPMENT (UE) INITIATED INTELLIGENT ADAPTIVE MEASUREMENT GAPS

BACKGROUND

In a fifth generation (5G) and other wireless networks (e.g., cellular networks), a user equipment (UE) normally in connected mode needs to continue measuring signal reception from neighboring cells, such as intra-frequency, inter-frequency, and inter-radio access technology (RAT) cells, to ensure that it is connected to the best serving cell. To accomplish this, the UE is typically assigned a measurement gap to tune its radio to the target frequency. This is even needed for 5G intra-frequency cells, because the UE might be measuring a frequency outside of its active bandwidth parts (BWPs).

While the UE is tuning its radio to perform the measurements, it cannot simultaneously transmit to or receive from its serving cell. The time period when the UE is unable to transmit to or receive from its serving cell is called a measurement gap. Measurement gaps may have higher priority than data or even signaling transmission, which negatively impacts data throughput for the wireless network.

SUMMARY

The following summary is provided to illustrate examples disclosed herein, but is not meant to limit all examples to any particular configuration or sequence of operations.

Solutions are disclosed that provide for user equipment (UE) initiated intelligent adaptive measurement gaps. Examples include: receiving, by a UE) from a wireless network, a radio resource control (RRC) message specifying a measurement gap repetition period (MGRP); determining, by the UE, that the UE has been stationary for a threshold length of time; and based on at least determining that the UE has been stationary for the threshold length of time, skipping at least one measurement gap specified by the MGRP.

BRIEF DESCRIPTION OF THE DRAWINGS

The disclosed examples are described below with reference to the accompanying drawing figures listed below, wherein:

FIG. 3 illustrates exemplary radio resource control (RRC) message content as may be used in the example architecture of FIG. 1;

FIG. 4 illustrates further detail for the UE of FIG. 1;

FIGS. 6 and 7 illustrate flowcharts of exemplary operations associated with the architecture of FIG. 1.

Figure 1:
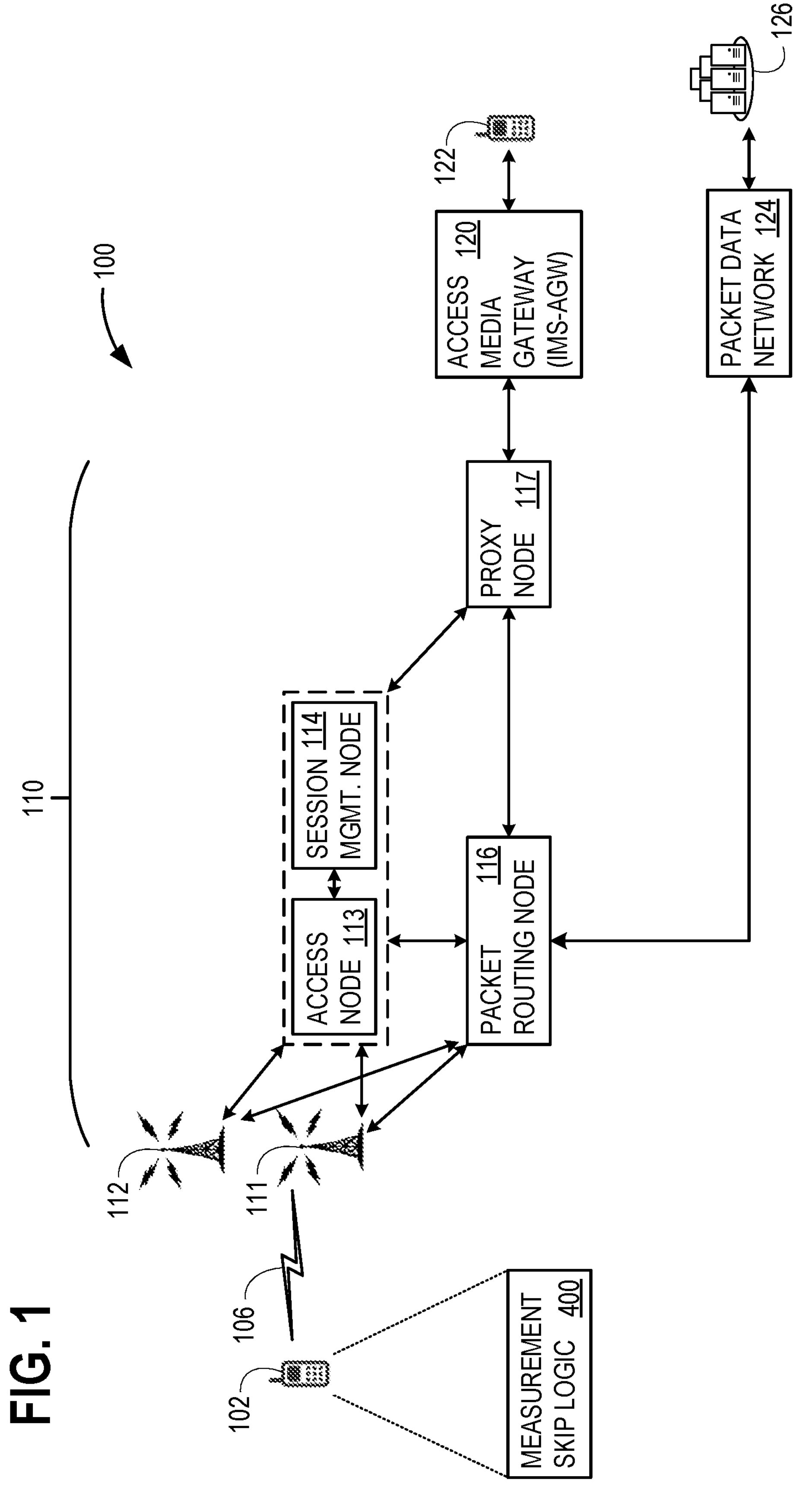
FIG. 1 illustrates an exemplary architecture that advantageously provides for user equipment (UE) initiated intelligent adaptive measurement gaps.

Corresponding reference characters indicate corresponding parts throughout the drawings. References made throughout this disclosure. relating to specific examples, are provided for illustrative purposes, and are not meant to limit all implementations or to be interpreted as excluding the existence of additional implementations that also incorporate the recited features.

DETAILED DESCRIPTION

Solutions are disclosed that provide for user equipment (UE) initiated intelligent adaptive measurement gaps. A stationary (non-moving) UE has a reduced likelihood of requiring a handover (HO) to a neighboring cell and thus, unless the serving cell has degraded or interference has increased, a reduced urgency of measuring signal reception from neighboring cells. A UE receives a radio resource control (RRC) message specifying a measurement gap repetition period (MGRP) from a wireless network, and upon determining that it has been stationary (within some range) for a threshold length of time, skips a measurement gap specified by the MGRP. In some examples, the UE uses changes (or lack thereof) in the uplink timing advance to ascertain whether it has moved or been stationary. In some examples, the MGRP is indicated as having one of four values: 20 milliseconds (ms), 40 ms, 80 ms, and 160 ms.

Aspects of the disclosure improve the efficiency of cellular networks without negatively impacting reliability, by reducing measurement gaps that interfere with network throughput. The result is that, with improved efficiency, UE battery life is extended, and the wireless network is able to carry a given amount of traffic within a shorter period of time. These advantageous results are accomplished, at least in part by, based on at least determining that the UE has been stationary for the threshold length of time, skipping at least one measurement gap specified by the MGRP.

With reference now to the figures, FIG. 1 illustrates an exemplary architecture 100 that advantageously provides for UE initiated intelligent adaptive measurement gaps. A wireless network 110 is illustrated that is serving a UE 102. UE 102 may be a cellular telephone, such as a smartphone, but may also represent other telecommunication devices capable of using a wireless network, such as a personal computer (PC, e.g., desktop, notebook, tablet, etc.) with a cellular modem.

UE 102 is stationary when it has not moved substantially, as measured using an uplink timing advance or a positioning system (e.g., GPS). An uplink timing advance is used to control the uplink transmission timing of individual UEs at different distances from the serving base station's antenna arrive at base station same time, to ensure that uplink transmissions from all UEs being served are synchronized when received by the base station. As a UE moves closer or further from the base station's antenna, its timing advance will change according to the radial distance the UE moves relative to the base station, using the relationship between time and distance is based on the propagation speed of radio signals ($3 \times 10^8$ meters per second). The timing advance is measurable in seconds, milliseconds (ms), or microseconds (μs), whereas position changes are measurable in meters. The timing advance takes on only a set of discrete values, due to the limited number of bits allocated to specify the timing advance in an RRC message. In some examples, the timing advance is quantized to a fixed set of predetermined values, such as 64 values within the range of −16.3 μs to +16.3 μs. In such examples, the timing advance increment (step size) is approximately 0.5 μs, corresponding to 155 meters.

In the scene depicted in FIG. 1, UE 102 is using wireless network 110 for a packet data session to reach a network resource 126 (e.g., a website) across an external packet data network 124 (e.g., the internet) or a phone call with another UE 122. Wireless network 110 may be a cellular network such as a fifth generation (5G) network, a fourth generation (4G) network, or another cellular generation network.

UE 102 uses an air interface 106 to communicate with base station 111 of wireless network 110. A base station 112 is a neighboring base station of base station 111. UE 102 is able to receive and measure signals from base station 112, but base station 111 is the serving base station (providing the serving cell). Base station 111 and base station 112 may be physically separated, or may be co-located and providing cells at different frequencies.

In some scenarios, base station 111 and base station 112 may each also be referred to as a radio access network (RAN). Wireless network 110 has an access node 113, a session management node 114, and other components (not shown). Wireless network 110 also has a packet routing node 116 and a proxy node 117. Access node 113 and session management node 114 are within a control plane of wireless network 110, and packet routing node 116 is within a user plane of wireless network 110.

Base station 111 and base station 112 are each in communication with access node 113 and packet routing node 116. Access node 113 is in communication with session management node 114 which is in communication with multiple other control plane and user plane nodes of wireless network 110. Packet routing node 116 is in communication with session management node 114, proxy node 117, and packet data network 124. In some 5G examples, base stations 111 and 112 each comprises a gNodeB (gNB), access node 113 comprises an access mobility function (AMF), session management node 114 comprises a session management function (SMF), and packet routing node 116 comprises a user plane function (UPF).

In some 4G examples, base station 111 comprises an eNodeB (eNB), access node 113 comprises a mobility management entity (MME), session management node 114 comprises a system architecture evolution gateway (SAEGW) control plane (SAEGW-C), and packet routing node 116 comprises an SAEGW-user plane (SAEGW-U). In some examples, proxy node 117 comprises a proxy call session control function (P-CSCF) in both 4G and 5G.

In some examples, wireless network 110 has multiple ones of each of the components illustrated, in addition to other components and other connectivity among the illustrated components. In some examples, wireless network 110 has components of multiple cellular technologies operating in parallel in order to provide service to UEs of different cellular generations. For example, base stations 111 and 112 may each comprise a gNB or eNB, and may use different access nodes. In some examples, multiple cells may be co-located at a common cell site, and may be a mix of 5G and 4G.

Proxy node 117 is in communication with an internet protocol (IP) multimedia system (IMS) access gateway (IMS-AGW) 120 within an IMS, in order to provide connectivity to other wireless (cellular) networks, such as for a call with UE 122 or a public switched telephone system (PSTN, also known as plain old telephone system, POTS). In some examples, proxy node 117 may be considered to be within the IMS. UE 102 reaches network resource 126 using packet data network 124 or IMS-AGW 120, in some examples. Data packets from UE 102 pass through at least base station 111 and packet routing node 116 on their way to packet data network 124 or IMS-AGW 120 (via proxy node 117).

As UE 102 moves, it may need to be handed over to a different serving cell (e.g., provided by base station 112), whereas if UE 102 is stationary, it may continue using the same serving cell unless the serving cell degrades, otherwise becomes unavailable, or problematic interference arises. Typically, a handover begins with a measurement report for a measurement of a neighboring cell during a measurement gap. The measurement report may include a mobility event such as an Event A3 (i.e., a neighbor cell is better than the serving cell by an offset), or an Event A2 (i.e., the serving cell signal falls below a threshold). Wireless network 110 then instructs UE 102 to move from one cell to another cell, either at the same frequency layer or a different frequency layer, with an HO command. The HO command normally comes to UE 102 through an RRCReconfiguration message that contains the radio parameters UE 102 needs to connect to the target cell (i.e., the new cell to which UE 102 is being handed over).

Figures 2A, 2B, 2C:
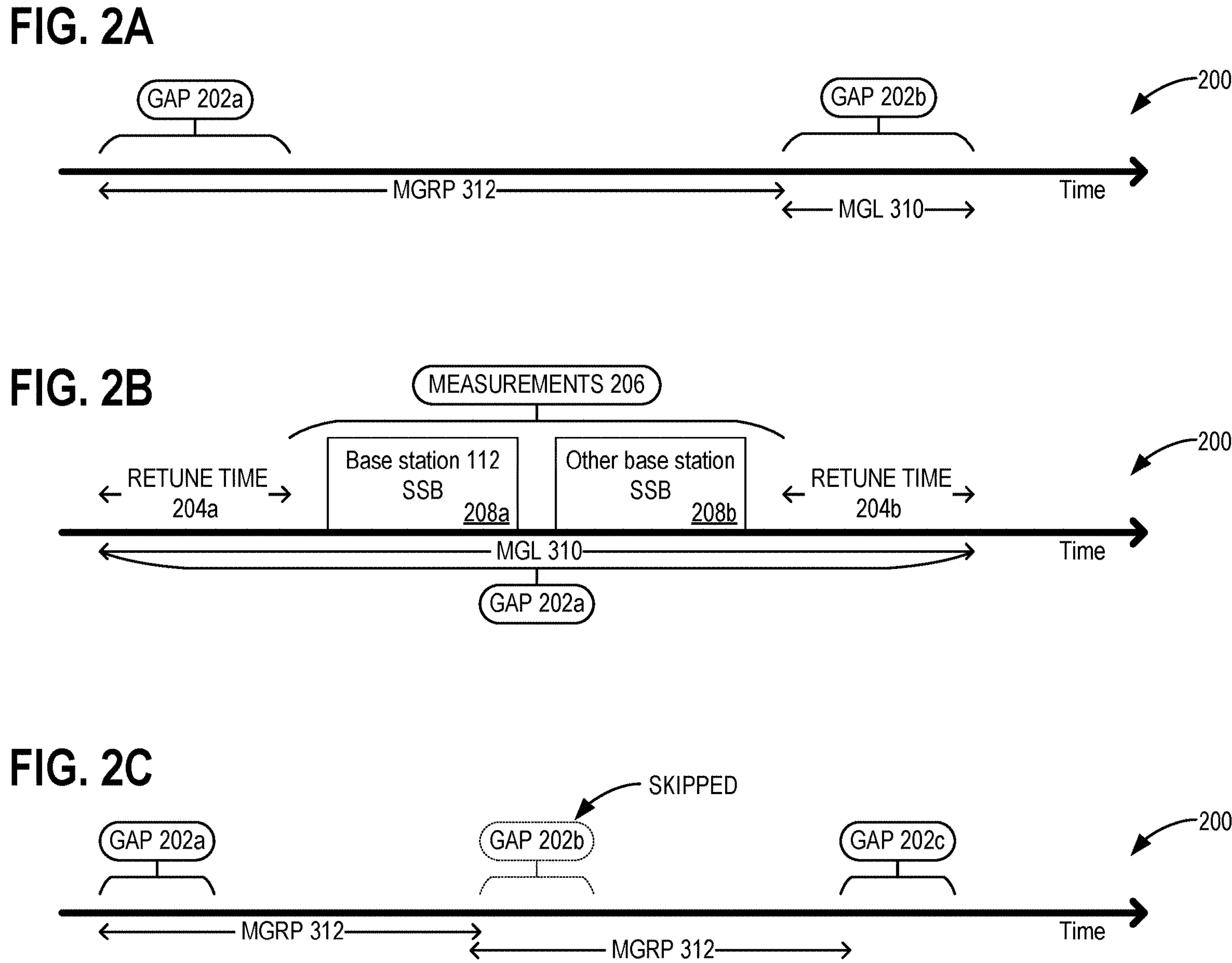
FIGS. 2A, 2B, and 2C illustrate timelines of measurement gaps, as may occur in the example architecture of FIG. 1.

Measurement gaps are illustrated in FIGS. 2A-2C, below. A measurement gap creates a small gap in normal UE to base station data traffic during which no transmission and reception occurs, so that the UE is able to tune its radio to a neighbor cell frequency and perform a signal quality measurement of the signal received from the neighbor cell. Wireless network 110 instructs UEs 102 regarding measurement gaps using RRC signalings. The instructions include a selected MGRP and a selected measurement gap length (MGL).

FIG. 2A illustrates a timeline 200*a* of measurement gaps, including a measurement gap 202*a* and a measurement gap 202*b*. In timeline 200*a*, measurement gaps (e.g., measurement gaps 202*a* and 202*b*) repeat on a period shown by a MGRP 312, which is also shown in FIG. 3 and described in further detail below. Each of measurement gaps 202*a* and 202*b* lasts for a duration of measurement gap length (MGL) 310, which is also shown in FIG. 3 and described in further detail below.

FIG. 2B illustrates a timeline 200*b*, which is a close-up view of measurement gap 202*a*. Measurement gap 202*b* and other measurement gaps are similar. Measurement gap 202*a* begins with a retune time 204*a*, which is followed by a measurements period 206, at which time UE 102 is able to perform signal quality measurements of neighboring base stations, such as neighboring base station 112. The signal quality measurements may be performed on synchronization signal blocks (SSBs) of neighboring base stations in 5G. As illustrated a measurement is performed on an SSB 208*a* of base station 112, and another measurement is performed on an SSB 208*b* of another neighboring base station (if any). After measurements period 206, another retune time 204*b* is needed before the UE can go back to transmitting to and receiving from serving base station 111.

FIG. 2C illustrates a timeline 200*c*, in which measurement gap 202*a* is used for measurements, measurement gap 202*b* is skipped, and measurements resume in a measurement gap 202*c*. In general the network throughput efficiency improvement is given by:

$$\text{Improvement}\,(\%) = \frac{N \times MGL}{(N+1) \times (MGRP)} \times 100\% \qquad \text{Eq. (1)}$$

where N is the number of measurement gaps that are skipped.

As an example, for an MGRP of 40 milliseconds (ms) and an MGL of 6 ms, skipping one measurement gap (out of every 2 consecutive measurement gaps or MGRPs), has N=1 and Eq. (1) solves to a fraction of 6/80, which is 7.5%. Skipping two measurement gaps (out of every 3 consecutive measurement gaps), has N=2 and Eq. (1) solves to a fraction of 12/120, which is 10%. As expected, the higher number of measurement gaps that are skipped, the higher the resulting network throughput efficiency improvement is.

FIG. 3 illustrates an exemplary RRC message 300 in the form of an RRCReconfiguration message as specified by pseudocode in European Telecommunications Standards Institute (ETSI) technical standard (TS) 138 331 section 6.2.2 Message Definitions and section 6.3.2 Radio Resource Control Information Elements. ETSI TS 138 331 has a corresponding Third Generation Partnership Project (3GPP) TS 38.331. A new element has been added to the TS specifications, as noted below.

RRC message 300 has a MeasConfig information element 302 that is introduced by a MeasConfig type declaration 302*a* and contains MeasConfig content 302*b*. MeasConfig content 302*b* has a MeasGapConfig information element 304 that is introduced by a MeasGapConfig type declaration 304*a* and contains MeasGapConfig content 304*b*. MeasGapConfig content 304*b* contains a GapConfig information element 306 that has GapConfig content 306*a*.

GapConfig content 306*a* has a gapOffset 308, MGL 310, MGRP 312, and a measurement gap timing advance (MGTA) 314. The value of gapOffset 308 points to the starting subframe when a measurement gap should occur. MGTA 314 is optional in some examples. The value of MGL 310 specifies the length of a measurement gap in milliseconds, and is currently constrained to take on only a limited set of possible values: 1.5 ms, 3.0 ms, 3.5 ms, 4.0 ms, 5.5 ms, and 6 ms. The value of MGRP 312 specifies the repetition period of a measurement gap in milliseconds, and is also currently constrained to take on only a limited set of possible values: 20 ms, 40 ms, 80 ms, and 160 ms.

The relevant TSs, with which cellular base station and user equipment providers strive to remain compatible, does not allow extending MGRP 312 beyond 160 ms. This is because the time specification for MGRP 312 can be set using only 2 data bits. A set of 2 bits may represent up to 4 different values.

Figure 4:
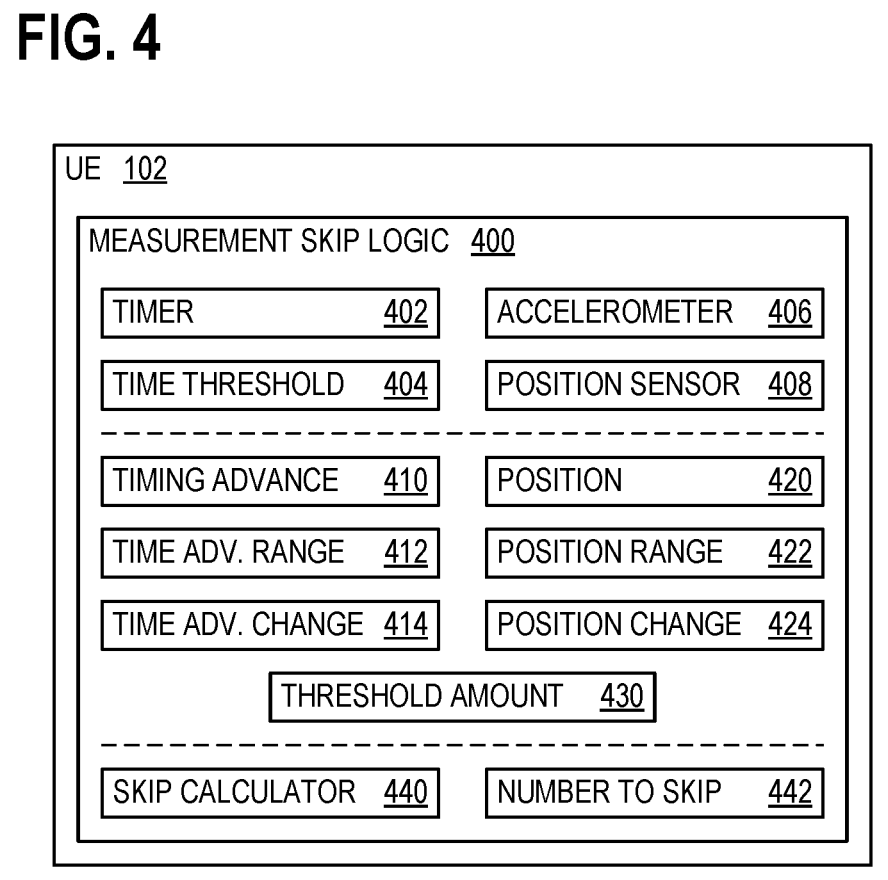

FIG. 4 illustrates further detail for measurement skip logic 400. Measurement skip logic 400 determines when UE 102 is sufficiently stationary to skip measurements of the signal quality of neighboring base stations, and how many measurements should be skipped. Measurement skip logic 400 has a timer 402 that is used to measure out a threshold length of time 404, during which UE 102 has remained stationary. Multiple ways are available to ascertain whether UE 102 is stationary or moving, such as using an uplink timing advance 410 and/or a position 420 of UE 102. When using uplink timing advance 410, a change 414 in uplink timing advance 410 may be compared with a timing advance range 412.

Timing advance range 412 provides a maximum time value by which uplink timing advance 410 can change, and UE 102 be deemed to be in effectively the same location. In some examples, timing advance range 412 is zero, because the timing advance changes in increments and the timing advance increment itself is used to define what it means for UE 102 to be stationary. In some examples, timing advance range 412 is an integer multiple of the timing advance increment, such as 1 or 2 times the value of the timing advance increment. If change 414 in uplink timing advance 410 remains within timing advance range 412, UE 102 is deemed to be stationary, whereas if change 414 in uplink timing advance 410 goes outside timing advance range 412, UE 102 is deemed to be moving.

Similarly, when using position 420, a change 424 in position 420 may be compared with a timing advance range 412. Position range 422 provides a maximum time value by which position 420 can change, and UE 102 be deemed to be in effectively the same location. In some examples, position range 422 is set to the physical distance of radial movement (toward/away from base station 111) of UE 102 in order to change uplink timing advance 410 by the timing advance increment (e.g., approximately 155 meters), or an integer multiple of this amount that is unlikely to trigger a handover. If change 424 in position 420 remains within position range 422, UE 102 is deemed to be stationary, whereas if change 424 in position 420 goes outside position range 422, UE 102 is deemed to be moving. UE 102 has a position sensor 408, such as a GPS sensor, to measure position 420.

UE 102 also has an accelerometer 406, which provides signals commensurate with movement of UE 102. In some examples, accelerometer 406 is used as a trigger to determine whether UE 102 is stationary or moving. When UE 102 moves, timer 402 is reset, and continues to be reset until UE 102 is no longer moving. A threshold amount 430 of movement is used as the determination of whether UE 102 is stationary or moving. Threshold amount 430 may be based on timing advance range 412 alone, position range 422 alone, or a weighted combination.

A skip calculator 440 determines a maximum number of measurements 442 that is safe (recommended) for UE to skip, for example based on the signal quality received from base station 111. When the signal quality received from base station 111 is high relative to the next highest signal quality from another base station (e.g., base station 112), number of measurements 442 may be higher than when the signal quality received from base station 111 is not high relative to the next highest signal quality from another base station.

Figure 5:
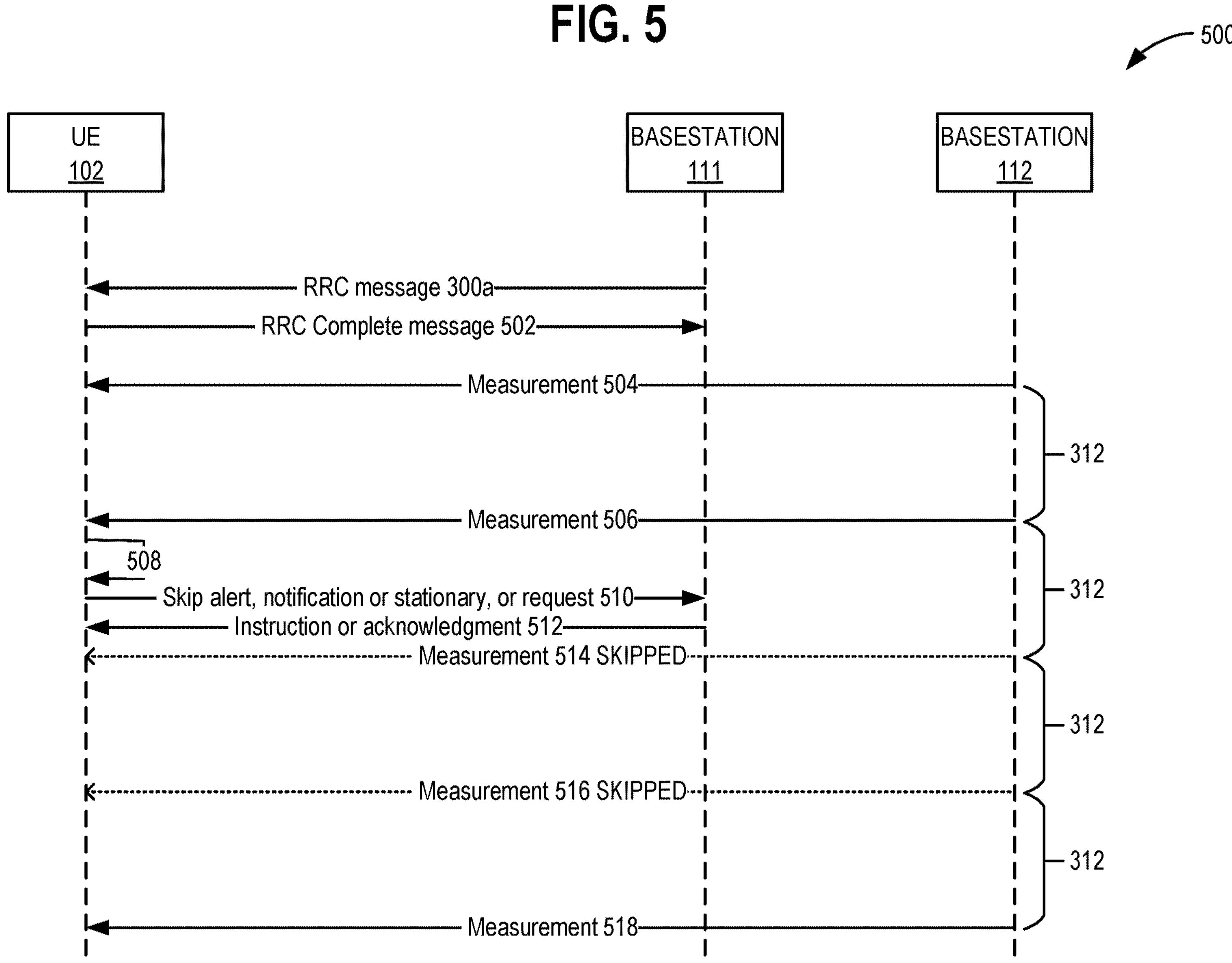
FIG. 5 illustrates a message sequence diagram of messages that may be used in the example architecture of FIG. 1.

FIG. 5 illustrates a message sequence diagram 500 of messages that may be used in architecture 100. Base station 111 transmits RRC message 300*a* to UE 102, including MGRP 312. RRC message 300*a* is an example of RRC message 300 of FIG. 3. UE 102 responds with an RRCReconfigurationComplete message 502. UE 102 performs a measurement 504 of the signal quality of base station 112, at a time determined by MGRP 312. At a later time, also determined by MGRP 312, UE 102 performs another measurement 506 of the signal quality of base station 112.

Measurement skip logic 400 determines that UE 102 is sufficiently stationary to skip at least some measurements of the signal quality of base station 112, as shown by a decision 508. UE 102 alerts base station 111 that it has been stationary, is skipping measurements, and/or requests to skip measurements, with a message 510. Base station 111 responds with an instruction to skip measurements or an acknowledgment in a message 512. In some examples, message 512 comprises an RRC message 300 with a count of measurement gaps to skip included. Thus, at least some measurements scheduled according to MGRP 312, a measurement 514 and a measurement 516, are skipped and not performed.

Based on having skipped maximum number of measurements 442 that measurement skip logic 400 determines is safe to skip, or detecting that UE 102 is no longer stationary (i.e., is moving), UE 102 resumes measuring the signal quality of base station 112. The next measurement that occurs is a measurement 518. The time that UE 102 is not spending on measurements 514 and 516 is available for UE 102 to use for sending or receiving data from base station 111, improving the throughput and efficiency of wireless network 110.

FIG. 6 illustrates a flowchart 600 of exemplary operations associated with examples of architecture 100. In some examples, at least a portion of flowchart 600 may be performed using one or more computing devices 800 of FIG. 8. Flowchart 600 commences with UE 102 registering with wireless network 110 in operation 602. In some examples, UE 102 comprises a cellular telephone.

In operation 604, wireless network 110 transmits RRC message 300*a* specifying MGRP 312 to UE 102, and UE 102 receives RRC message 300*a* specifying MGRP 312 from wireless network 110. In some examples, RRC message 300*a* comprises an example of the RRCReconfiguration message of FIG. 3, and MGRP 312 is within MeasGapConfig information element 304 of RRC message 300*a*. MGRP 312 is within MeasGapConfig information element 304 of RRC message 300*a*, and MeasGapConfig information element 304 of RRC message 300*a* is within MeasConfig information element 302 of RRC message 300*a*. In some examples, MGRP 312 is indicated as having a value selected from among the four values: 20 ms, 40 ms, 80 ms, and 160 ms. UE 102 responds by transmitting an RRCReconfigurationComplete message, in some examples.

UE 102 starts timer 402 in operation 606. Timer 402 is used to determine whether threshold length of time 404 has been met. In some examples, UE 102 starts (or restarts) timer 402, based on at least UE 102 completing a handover or detecting that UE 102 is moving. In operation 608, UE 102 detects whether it is moving or stationary. In some examples, detecting that UE 102 is stationary comprises determining that uplink timing advance 410 has remained consistent within timing advance range 412 and/or that the position of UE 102 has remained consistent within position range 422. In some examples, detecting that UE 102 is moving comprises determining that change 414 in uplink timing advance 410 is outside timing advance range 412 and/or that change 424 in position 420 of UE 102 is outside position range 422. Some examples use accelerometer 406 as a trigger to determine whether UE 102 is moving. In some examples, UE 102 has been stationary when UE 102 has not moved more than threshold amount 430 as measured by uplink timing advance 410 or position 420;

Decision operation 610 determines whether UE 102 is moving. If so, flowchart 600 returns to operation 606 to start (restart) timer 402. If UE 102 is not moving (i.e., is stationary), decision operation 612 determines whether UE 102 senses that it has been stationary for threshold length of time 404. If not, flowchart 600 returns to operation 608 to continue monitoring whether it is moving or stationary.

If, however, UE 102 determines that it has been stationary for threshold length of time 404 in decision operation 612, (in some examples) UE 102 determines how many measurement gaps to skip in operation 614. Some examples instead let wireless network 110 make this determination in operation 618, as described below.

In operation 616, UE 102 transmits an indication that UE 102 is stationary, a request to skip at least one measurement gap, or an alert that UE will be skipping a measurement gap (and how many) as message 510, and wireless network receives message 510. In some examples, wireless network 110 determines how many measurement gaps UE 102 should skip, or approves the request form UE 102 in operation 618. In operation 620, wireless network 110 transmits an approval, acknowledgement, or instruction (an indication) for UE 102 to skip at least one measurement gap as message 512, and UE 102 receives message 512. Because wireless network 110 knows that UE 102 will be skipping a measurement gap, the time that would have been used for skipped measurement gap 202*b* may instead be used to schedule data traffic to/from UE 102.

UE 102 skips at least one measurement gap (e.g., measurement gap 202*b*) specified by MGRP 312 in operation 622. In some examples, this is unilateral by UE 102, based in at least determining that UE 102 has been stationary for threshold length of time 404. In some examples, this is also based on at least receiving the indication to skip at least one measurement gap from wireless network 110. Flowchart then moves back to operation 602 or, if it is time for wireless network to transmit another RRC message to UE 102 (e.g., as part of a handover), to operation 608

FIG. 7 illustrates a flowchart 700 of exemplary operations associated with examples of architecture 100. In some examples, at least a portion of flowchart 700 may be performed using one or more computing devices 800 of FIG. 8. Flowchart 700 commences with operation 702, which includes receiving, by a UE, from a wireless network, an RRC message specifying an MGRP. Operation 704 includes determining, by the UE, that the UE has been stationary for a threshold length of time. Operation 706 includes, based on at least determining that the UE has been stationary for the threshold length of time, skipping at least one measurement gap specified by the MGRP.

Figure 8:
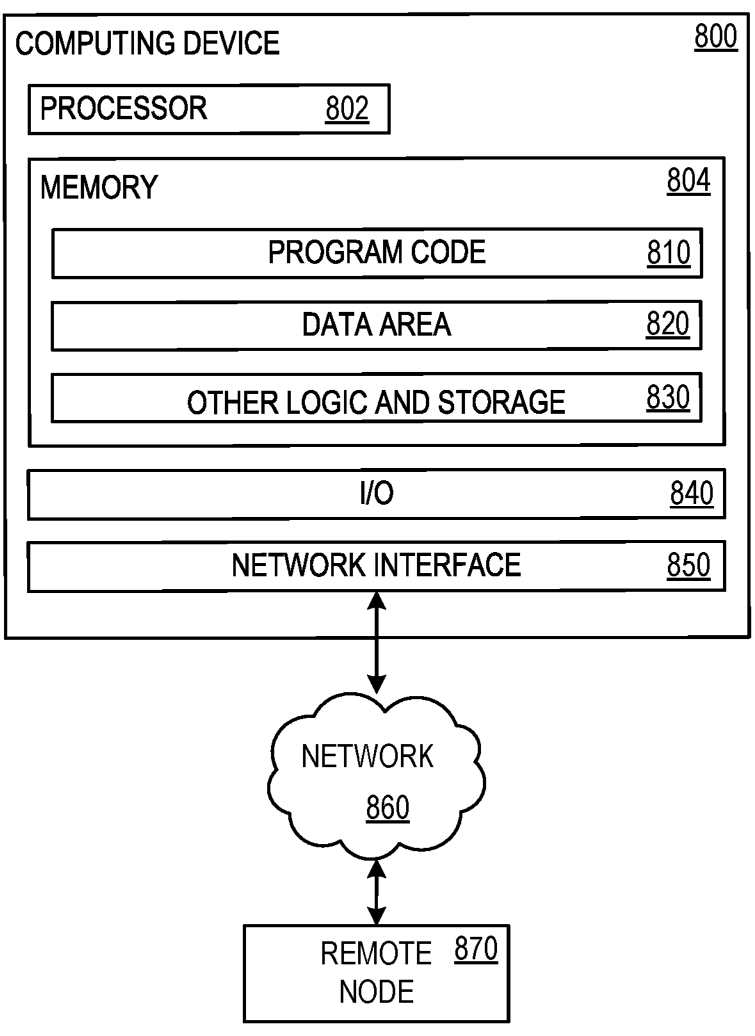
FIG. 8 illustrates a block diagram of a computing device suitable for implementing various aspects of the disclosure.

FIG. 8 illustrates a block diagram of computing device 800 that may be used as any component described herein that may require computational or storage capacity. Computing device 800 has at least a processor 802 and a memory 804 that holds program code 810, data area 820, and other logic and storage 830. Memory 804 is any device allowing information, such as computer executable instructions and/or other data, to be stored and retrieved. For example, memory 804 may include one or more random access memory (RAM) modules, flash memory modules, hard disks, solid-state disks, persistent memory devices, and/or optical disks. Program code 810 comprises computer executable instructions and computer executable components including instructions used to perform operations described herein. Data area 820 holds data used to perform operations described herein. Memory 804 also includes other logic and storage 830 that performs or facilitates other functions disclosed herein or otherwise required of computing device 800. An input/output (I/O) component 840 facilitates receiving input from users and other devices and generating displays for users and outputs for other devices. A network interface 850 permits communication over external network 860 with a remote node 870, which may represent another implementation of computing device 800. For example, a remote node 870 may represent another of the above-noted nodes within architecture 100.

ADDITIONAL EXAMPLES

An example system comprises: a processor; and a computer-readable medium storing instructions that are operative upon execution by the processor to: receive, by a UE, from a wireless network, an RRC message specifying an MGRP; determine, by the UE, that the UE has been stationary for a threshold length of time; and based on at least determining that the UE has been stationary for the threshold length of time, skip at least one measurement gap specified by the MGRP.

An example method of wireless communication comprises: receiving, by a UE, from a wireless network, an RRC message specifying an MGRP; determining, by the UE, that the UE has been stationary for a threshold length of time; and based on at least determining that the UE has been stationary for the threshold length of time, skipping at least one measurement gap specified by the MGRP.

One or more example computer storage devices has computer-executable instructions stored thereon, which, upon execution by a computer, cause the computer to perform operations comprising: receiving, by a UE, from a wireless network, an RRC message specifying an MGRP, wherein the UE comprises a cellular telephone; determining, by the UE, that the UE has been stationary for a threshold length of time, wherein the UE has been stationary when the UE has not moved more than a threshold amount as measured by timing advance or position; and based on at least determining that the UE has been stationary for the threshold length of time, skipping at least one measurement gap specified by the MGRP.

Alternatively, or in addition to the other examples described herein, examples include any combination of the following:

- based on at least a handover of the UE or detecting, by the UE, that the UE is moving, starting a timer;
- the timer is used to determine whether the threshold length of time has been met;
- detecting that the UE is stationary comprises determining that an uplink timing advance has remained consistent within a timing advance range;
- detecting that the UE is moving comprises determining that a change in the uplink timing advance is outside the timing advance range;
- detecting that the UE is stationary comprises determining that a position of the UE has remained consistent within a position range;
- detecting that the UE is moving comprises determining that a change in the position of the UE is outside the position range;
- using an accelerometer of the UE as a trigger to determine whether the UE is moving;
- the UE has been stationary when the UE has not moved more than a threshold amount as measured by timing advance or position of the UE;
- the RRC message comprises an RRCReconfiguration message;
- the MGRP is within a MeasGapConfig information element of the RRCReconfiguration message;
- the MGRP has a value of 20 ms, 40 ms, 80 ms, or 160 ms;
- the UE comprises a cellular telephone;
- the UE is stationary if it moves less than 155 meters;
- transmitting, by the UE, to the wireless network, an indication that the UE is stationary;
- transmitting, by the UE, to the wireless network, a request to skip at least one measurement gap;
- receiving, by the wireless network, from the UE, the indication that the UE is stationary;
- receiving, by the wireless network, from the UE, the request to skip at least one measurement gap;
- based on at least receiving the indication that the UE is stationary or the request to skip at least one measurement gap, transmitting, by the wireless network, to the UE, an indication to skip at least one measurement gap;
- receiving, by the UE, from the wireless network, the indication to skip at least one measurement gap;
- skipping at least one measurement gap is based on at least receiving the indication to skip at least one measurement gap; and
- scheduling data traffic for the UE during the at least one skipped measurement gap.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure. It will be understood that the benefits and advantages described above may relate to one embodiment or may relate to several embodiments. When introducing elements of aspects of the disclosure or the examples thereof, the articles “a,” “an,” “the,” and “said” are intended to mean that there are one or more of the elements. The terms “comprising,” “including,” and “having” are intended to be inclusive and mean that there may be additional elements other than the listed elements. The term “exemplary” is intended to mean “an example of.”

Having described aspects of the disclosure in detail, it will be apparent that modifications and variations are possible without departing from the scope of aspects of the disclosure as defined in the appended claims. As various changes may be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A method of wireless communication, the method comprising:

- receiving, by a user equipment (UE), from a wireless network, a radio resource control (RRC) message specifying a measurement gap repetition period (MGRP), the RRC message configuring the UE to perform signal quality measurements during measurement gaps defined by the MGRP;
- determining, by the UE, that the UE has been stationary for a threshold length of time; and
- based on at least determining that the UE has been stationary for the threshold length of time, determining that the UE will skip one or more of the measurement gaps defined by the MGRP;
- transmitting, by the UE to the wireless network, an indication that the UE will skip the one or more measurement gaps; and
- receiving, by the UE, a data transmission from the wireless network during the one or more measurement gaps, the data transmission being scheduled during the one or more measurement gaps after the UE transmitted the indication that the UE will skip the one or more measurement gaps.

2. The method of claim 1, further comprising:

- based on at least a handover of the UE or detecting, by the UE, that the UE is moving, starting a timer, wherein the timer is used to determine whether the threshold length of time has been met.

3. The method of claim 1, wherein determining that the UE has been stationary for the threshold length of time comprises determining that an uplink timing advance has remained consistent within a timing advance range.

4. The method of claim 1, wherein determining that the UE has been stationary for the threshold length of time comprises determining that a position of the UE has remained consistent within a position range.

5. The method of claim 1, further comprising:

using an accelerometer of the UE as a trigger to determine whether the UE is moving.

6. The method of claim 1, wherein the UE has been stationary when the UE has not moved more than a threshold amount as measured by timing advance or position of the UE.

7. The method of claim 1, wherein the RRC message comprises an RRCReconfiguration message, wherein the MGRP is within a MeasGapConfig information element of the RRCReconfiguration message, and wherein the MGRP is indicated as having a value selected from a list consisting of:

20 milliseconds (ms), 40 ms, 80 ms, and 160 ms.

8. The method of claim 1, wherein the UE comprises a cellular telephone.

9. A system comprising:

a processor; and a memory storing programming instructions for execution by the processor, the programming instructions, upon execution by the processor, causing the system to perform the following operations:

receiving, by a user equipment (UE), from a wireless network, a radio resource control (RRC) message specifying a measurement gap repetition period (MGRP), the RRC message configuring the UE to perform signal quality measurements during measurement gaps defined by the MGRP;

determining, by the UE, that the UE has been stationary for a threshold length of time; and based on at least determining that the UE has been stationary for the threshold length of time, determining that the UE will skip one or more of the measurement gaps defined by the MGRP;

transmitting, by the UE to the wireless network, an indication that the UE will skip the one or more measurement gaps; and receiving, by the UE, a data transmission from the wireless network during the one or more measurement gaps, the data transmission being scheduled during the one or more measurement gaps after the UE transmitted the indication that the UE will skip the one or more measurement gaps.

10. The system of claim 9, wherein the programing instructions further cause the system to perform the following operation:

based on at least a handover of the UE or detecting, by the UE, that the UE is moving, starting a timer, wherein the timer is used to determine whether the threshold length of time has been met.

11. The system of claim 9, wherein determining that the UE has been stationary for the threshold length of time comprises determining that an uplink timing advance has remained consistent within a timing advance range.

12. The system of claim 9, wherein determining that the UE has been stationary for the threshold length of time comprises determining that a position of the UE has remained consistent within a position range.

13. The system of claim 9, wherein the programing instructions further cause the system to perform the following operation:

using an accelerometer of the UE as a trigger to determine whether the UE is moving.

14. The system of claim 9, wherein the UE has been stationary when the UE has not moved more than a threshold amount as measured by timing advance or position of the UE.

15. The system of claim 9, wherein the RRC message comprises an RRCReconfiguration message, wherein the MGRP is within a MeasGapConfig information element of the RRCReconfiguration message, and wherein the MGRP is indicated as having a value selected from a list consisting of:

20 milliseconds (ms), 40 ms, 80 ms, and 160 ms.

16. The system of claim 9, wherein the UE comprises a cellular telephone.

17. One or more computer storage devices storing programming instructions for execution by a processor of a system, the programming instructions, upon execution by the processor, causing the system to perform the following operations:

receiving, by a user equipment (UE), from a wireless network, a radio resource control (RRC) message specifying a measurement gap repetition period (MGRP), the RRC message configuring the UE to perform signal quality measurements during measurement gaps defined by the MGRP, and wherein the UE comprises a cellular telephone;

determining, by the UE, that the UE has been stationary for a threshold length of time, wherein the UE has been stationary when the UE has not moved more than a threshold amount as measured by timing advance or position of the UE; and based on at least determining that the UE has been stationary for the threshold length of time, determining that the UE will skip one or more of the measurement gaps defined by the MGRP;

transmitting, by the UE to the wireless network, an indication that the UE will skip the one or more measurement gaps; and receiving, by the UE, a data transmission from the wireless network during the one or more measurement gaps, the data transmission being scheduled during the one or more measurement gaps after the UE transmitted the indication that the UE will skip the one or more measurement gaps.

18. The one or more computer storage devices of claim 17, wherein the programing instructions further cause the system to perform the following operation:

based on at least a handover of the UE or detecting, by the UE, that the UE is moving, starting a timer, wherein the timer is used to determine whether the threshold length of time has been met.

19. The one or more computer storage devices of claim 17, wherein determining that the UE has been stationary for the threshold length of time comprises determining that an uplink timing advance has remained consistent within a timing advance range.

20. The one or more computer storage devices of claim 17, wherein determining that the UE has been stationary for the threshold length of time comprises determining that a position of the UE has remained consistent within a position range.

* * * * *